Sept. 9, 1941.  J. B. HOOD  2,255,384

NUT

Filed May 27, 1939

INVENTOR.
James Bruce Hood.

BY Warren E. Willis.
ATTORNEY.

Patented Sept. 9, 1941

2,255,384

UNITED STATES PATENT OFFICE 2,255,384

NUT

James Bruce Hood, New York, N. Y.

Application May 27, 1939, Serial No. 276,145

3 Claims. (Cl. 151—22)

This invention relates to nuts, in which term is included any object, of any material and of any exterior shape, having an opening in which is formed a helical groove, known as a thread, adapted to engage on an externally screw threaded object of corresponding and constant diameter, shape and pitch.

The term "pitch" is indicative of the number of threads or helical grooves per inch in length; different diameters commonly have threads of different pitches.

It is well known that nuts do frequently become loosened from the parts on which they are engaged, due to jars, vibration and other causes, such conditions being known as working loose.

In order to avoid such occurrences recourse has been made to numerous expedients, as lock nuts, lock washers, cotter pins, etc., etc.

It will therefore be apparent that a nut which will remain in its adjusted position is desirable, in fact a necessity in the construction of many mechancal structures.

It is therefore an object of this invention to provide a nut that will unfailingly cling to the part to which it is applied, irrespective of conditions that would loosen a nut of common type.

These advantageous objects are accomplished by the novel construction and arrangement of the internal portion of a plain nut, as hereinafter described and illustrated in the accompanying drawing, constituting a component of this disclosure, and in which—

Figure 1:
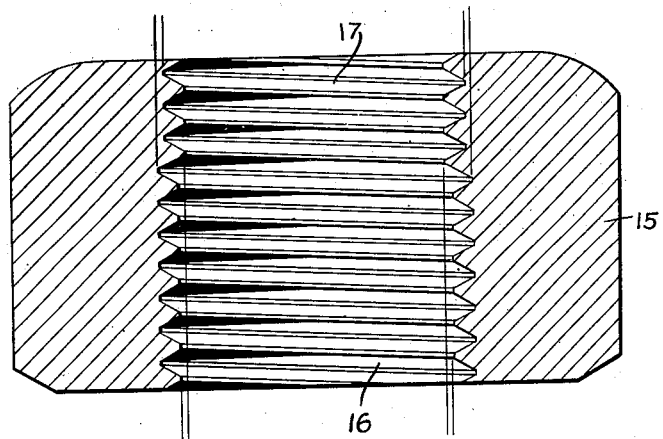
Figure 1 is a vertical sectional view of a conventional nut screw threaded in accordance with the invention.

In the present invention the nut 15, shown in section in Figure 1, has its threads formed as shown, to two distinct diameters, the greater of which may be regarded as standard, entering from the bottom, or under face, of the nut through approximately two thirds of the thickness of the body, as indicated at 16, while its upper portion is subnormal or reduced in diameter the reduction being but a small fraction of an inch depending on the nominal size of the nut, its tolerances and other conditions.

It is to be understood that both the reduced and standard portions of the nut are of uniform diameter at each portion, not taper, of the same constant pitch and angle of thread.

In the commercial form of nut shown in Figures 2 to 5 a similar condition is indicated, having like characteristics.

The nut 20 is threaded throughout its entire thickness to produce a standard diameter of thread 21; thereafter the outer portion 22 of the thread is contracted, the junction being indicated at 23.

This is accomplished by forming in the upper face of the nut an annular recess 24, concentric with the threaded axial opening and thereafter compressing the resultant collar 25, effecting a closure of the threads therein to the desired extent, which, as before stated, is a scarcely appreciable fraction of an inch.

Figure 5:
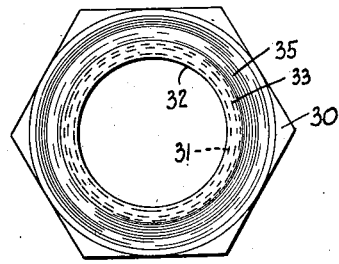
Figure 5 is a top plan view thereof.
Figure 3:
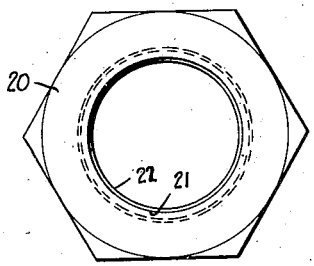
Figure 3 is a bottom plan view of the nut shown in Figures 1 and 2.
Figure 4:
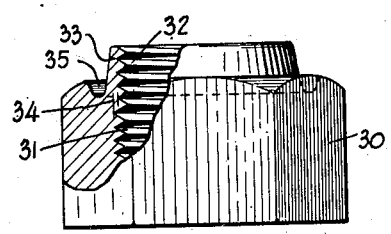
Figure 4 is a partial side elevational, partial sectional view of a further modified nut.

The further modified nut 30, shown in Figures 4 and 5, is of the same type of construction, having a standard thread 31 in its main body and a contracted thread 32 in its outwardly extending annular flange or collar 33, the junction, shown accentuated at 34, substantially in the plane of the bottom of a shallow annular groove 35 in the upper face of the nut.

Figure 2:
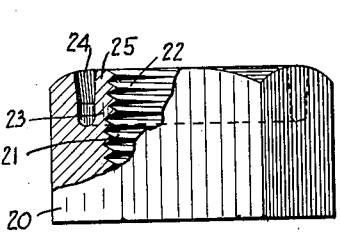
Figure 2 is a side elevational view of a common hexagonal nut, modified from Figure 1, and partially broken away to show the structural arrangement.

In Figure 2 the nut 20 has a standard diameter of thread 21 extending approximately to the bottom of the groove 24, thence the pitch diameter 22 of the thread is slightly less than standard.

The thickness of metal wall backing this portion of the thread is shown at 25, and is proportioned to expand elastically when engaging a mating screw element.

Similarly, in Figure 4 the nut 30 has two pitch diameters, 31 in the main body of the nut and 32 in the projecting collar or hoop 33 of reduced diameter.

The recess or groove 35 adds to the length of the collar 33 and avoids having an extended collar projection.

At 23, Figure 2, and 34 in Figure 4, the change in pitch diameter occurs so that the lesser diametered section of thread is wholly contained in the expansible collar 25 in Figure 2, and 33 in Figure 4.

It is to be noted that no nut as made at present, so far as can be ascertained, has the features claimed by this nut.

A nut threaded to two parallel pitch diameters, each having perfect pitch and angle of thread, so made that both flanks of the thread in the upper portion make intensive pressure contact with the same elements of an engaging screw, gives a positive holding grip, whether the nut is tightened on the work or not.

This allows for adjustment in cases where necessary without danger of the nut running off.

It will be obvious that ordinary nuts, when tightened, bear only on one flank of the threads.

There is no deformation of the thread, either in the angle or pitch, such as occurs with "bumped" threaded elements, which gives spot, or at best, line contact; thus the intensity of pressure becomes excessive or causes permanent deformation of the elements, as compared with the much greater areas of contact and low pressure within the elastic limit of the material obtained in the nut disclosed in Figure 4.

From the foregoing it will be seen that simple and practical nuts have been disclosed, their screw threads presenting an efficient grip, dispensing with all extraneous elements, inexpensive to produce and of pleasing appearance.

I claim:

1. A nut having its threads formed into a relatively upper and lower portion, a circular band composed of the upper portion of the thread as its inside surface and a ring of the metal extending immediately outward circumferentially from said portion of thread, the outer limit of said metal forming the outside surface of said band, the upper portion of the threads being distinguished from the lower portion by having a lesser but constant pitch diameter, both portions being continuous and having in common the same thread form and the same constant pitch, and both being concentrically parallel to the nut axis.

2. A nut having its threads formed into two continuous portions, one portion being of a lesser but constant pitch diameter than the other, a circular band composed of the lesser pitch diameter threads as its inside surface and a ring of the metal extending immediately outward circumferentially from the said portion of thread, the outer limit of said ring forming the outside surface of said band, the same constant pitch and the same thread form being maintained throughout the whole of the nut thread, said thread being throughout its entire length concentrically parallel to the nut axis.

3. A nut having its threads formed into two continuous portions, one portion being of a lesser but constant pitch diameter than the other and having an annular groove concentric with the said lesser pitch diameter thread whose inside wall forms the outside surface of a metal band whose inside surface is the lesser pitch diameter thread, the same constant pitch and the same thread form being maintained throughout the whole of the nut thread, said thread being throughout its entire length concentrically parallel to the nut axis.

JAMES BRUCE HOOD.